US012016097B2

(12) United States Patent
Boone et al.

(10) Patent No.: US 12,016,097 B2
(45) Date of Patent: Jun. 18, 2024

(54) FAILURE DETECTION AND CORRECTION FOR LED ARRAYS

(71) Applicant: Lumileds LLC, San Jose, CA (US)

(72) Inventors: Ronald Johannes Boone, Plainfield, IL (US); Sridhar Vajapey, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 115 days.

(21) Appl. No.: 17/785,360

(22) PCT Filed: Dec. 16, 2020

(86) PCT No.: PCT/US2020/065442
§ 371 (c)(1),
(2) Date: Jun. 14, 2022

(87) PCT Pub. No.: WO2021/127061
PCT Pub. Date: Jun. 24, 2021

(65) Prior Publication Data

US 2023/0007751 A1 Jan. 5, 2023

Related U.S. Application Data

(60) Provisional application No. 62/951,805, filed on Dec. 20, 2019.

(51) Int. Cl.
*H05B 45/50* (2022.01)
*H05B 45/12* (2020.01)
*H05B 45/325* (2020.01)

(52) U.S. Cl.
CPC ............. *H05B 45/50* (2020.01); *H05B 45/12* (2020.01); *H05B 45/325* (2020.01)

(58) Field of Classification Search
CPC ...... H05B 45/50; H05B 45/12; H05B 45/325; H05B 45/14; H05B 45/10; H05B 45/20
(Continued)

(56) References Cited

U.S. PATENT DOCUMENTS 8,199,401 B2 * 6/2012 Ninan .................. H04N 9/3102 345/55
8,687,271 B2 * 4/2014 Ninan .................. G09G 3/3611 345/55
(Continued)

FOREIGN PATENT DOCUMENTS

CN 115380324 A 11/2022
KR 20190046272 A 5/2019
(Continued)

OTHER PUBLICATIONS

"International Application Serial No. PCT/US2020/065442, International Search Report dated Mar. 24, 2021", 5 pgs.
(Continued)

*Primary Examiner* — Ryan Jager
(74) *Attorney, Agent, or Firm* — Schwegman, Lundberg & Woessner, P.A.

(57) ABSTRACT

A micro light-emitting diode (μLED) array system can include an image post processor configured to translate received image data to pulse width modulation (PWM) and/or analog current control data, an input frame buffer configured to receive the control data, a plurality of individually controllable μLEDS of a μLED array, a return frame buffer that receives data indicating a μLED electrical output characteristic including an output current, and compare circuitry configured to compare image data from the input and return frame buffers, and transfer comparison data to the image post processor, the image post processor configured to alter individual μLED control data based on the comparison data.

17 Claims, 7 Drawing Sheets

(58) Field of Classification Search
USPC .......................................................... 315/308
See application file for complete search history.

(56) References Cited

U.S. PATENT DOCUMENTS

| | | | | |
|---|---|---|---|---|
| 11,378,840 | B2 * | 7/2022 | Whitehead | G09G 3/3426 |
| 2010/0002026 | A1 * | 1/2010 | Seetzen | G09G 3/3426 345/690 |
| 2011/0297975 | A1 * | 12/2011 | Yeh | G03B 21/005 257/E27.12 |
| 2011/0299044 | A1 * | 12/2011 | Yeh | H04N 9/315 353/52 |
| 2018/0182279 | A1 * | 6/2018 | Sakariya | G09G 3/2088 |

FOREIGN PATENT DOCUMENTS

| | | | | |
|---|---|---|---|---|
| KR | 102033108 | B1 | 10/2019 | |
| WO | WO-2008092276 | A1 * | 8/2008 | G02F 1/133 |
| WO | WO-2008092276 | A1 | 8/2008 | |
| WO | WO-2010149027 | A1 | 12/2010 | |
| WO | WO-2016196390 | A1 | 12/2016 | |
| WO | WO-2018191551 | A1 * | 10/2018 | G09G 3/14 |
| WO | WO-2018191551 | A1 | 10/2018 | |
| WO | WO-2021127061 | A1 | 6/2021 | |

OTHER PUBLICATIONS

"International Application Serial No. PCT/US2020/065442, Written Opinion dated Mar. 24, 2021", 10 pgs.

Huang, Y, et al., "A CMOS image sensor with light-controlled oscillating pixels for an investigative optobionic retinal prosthesis system", Microelectronics Journal, Mackintosh Publications Ltd. Luton, GB, vol. 40, No. 8, (Aug. 1, 2009), 1202-1211.

"European Application Serial No. 20842611.4, Response to Communication pursuant to Rules 161(1) and 162 EPC filed Jan. 26, 2023", 52 pgs.

"International Application Serial No. PCT/US2020/065442, International Preliminary Report on Patentability dated Jun. 30, 2022", 12 pgs.

* cited by examiner

FAILURE DETECTION AND CORRECTION FOR LED ARRAYS

CLAIM OF PRIORITY

This application is a U.S. National Stage Filing under 35 U.S.C. 371 from International Application No. PCT/US2020/065442, filed on 16 Dec. 2020, which claims the benefit of priority to U.S. Provisional Patent Application No. 62/951,805, filed 20 Dec. 2019, and entitled, "FAILURE DETECTION AND CORRECTION FOR MICROLEDS WITH CMOS BACKPLANES," which are incorporated by reference herein in their entireties.

TECHNICAL FIELD

The present disclosure relates generally to detection (e.g., before deployment, in substrate real time, or during runtime) and correction of an image produced using a failed, failing, or otherwise defective light-emitting diode (LED), such as a microLED (μLED). Embodiments disclosed herein are useful in lighting or image-display systems that include LED pixel arrays. In this context, the term "pixel" means that the LEDs are spaced in a regular grid such that they appear as pixels.

BACKGROUND

Microscopic LED (μLED) arrays are an emerging technology. μLEDs are useful in lighting and display industries. The μLED arrays can benefit from circuits and systems supporting arrays of thousands to millions of microscopic LEDs (μLEDs). The μLEDs can actively emit light with individual LED control. That is, each μLED can include a dedicated driver circuit. As compared to backlight LED technologies, μLEDs can have higher brightness and a higher level of energy efficiency. These advantages can make μLEDs attractive for a variety of applications. The applications can include television display, automotive lighting, streetlighting, mobile phone display, or the like. To display an image, the electrical current levels of individual μLEDs in an array can be adjusted according to a specific image specification, light intensity, or color profile.

A μLED lighting system can be difficult to manufacture, with large numbers of μLEDs on an LED die and electrically coupled for power and control. Placing these μLEDs in tightly pitched arrays is challenging, with a great potential for μLED failure due to misplacement or various interconnection issues. These issues can be worse in large μLED arrays that already face power and data management problems. Individual light intensity of thousands of emitting μLEDs can be controlled, such as at sufficient refresh rates and fine-grained color and image control, to provide the desired image. Systems that provide for real time or near real time identification and correction of pixel faults in large matrix pixel arrays of microLEDs are needed.

SUMMARY

In one embodiment, a μLED array system includes an image post processor configured to translate received image data to pulse width modulation (PWM) and/or analog current control data (that is, the received image data is translated to at least one parameter selected from parameters including PWM and analog current control). The system can include an input frame buffer configured to receive the control data. The system can include a plurality of individually controllable μLEDS of a μLED array. The system can include a return frame buffer that receives data indicating a μLED electrical output characteristic including an output current. The system can include compare circuitry configured to compare image data from the input and return frame buffers, and transfer comparison data to the image post processor, the image post processor configured to alter individual μLED control data based on the comparison data.

In embodiments, the system can further include a memory including data indicating an expected output current for a given input current and wherein the compare circuitry is configured to access the memory to perform the comparison. The system can further include, wherein the image post processor is configured to increase a PWM on time and/or analog pixel current of a μLED (that is, at least one parameter selected from parameters including time and analog pixel current) with an output current less than the expected output current indicated in the memory. The system can further include, wherein the image post processor is configured to decrease a PWM on time and/or analog pixel current of a μLED with an output current greater than the expected output current indicated in the memory.

In embodiments, the system can further include, wherein the image post processor is configured to increase a PWM on time and/or an analog pixel current of one or more μLEDs directly adjacent to a μLED with output current more than a threshold less than the expected output current indicated in the memory. The system can further include, wherein the μLEDs are monitored sequentially, with an individual μLED monitored for each received image. The system can further include, wherein the image post processor is configured to increase an intensity of a most proximate neighboring μLED of a first color for a next image in response to receiving data indicating a μLED of the first color is not producing sufficient output current.

In embodiments, a method for error correction for a micro light-emitting diode (μLED) die is disclosed and can include post processing received image data to be displayed by μLEDs of the μLED die. The method can further include transferring the processed image data to an input frame buffer. The method can further include activating the μLED array in accord with the processed image data. The method can further include determining actual electrical activity of one or more of the μLEDs including output current. The method can further include transferring the actual electrical activity to a return frame buffer. The method can further include comparing the actual electrical activity from the return frame buffer to expected electrical activity, the expected electrical activity determined based on the processed image data in the input frame buffer. The method can further include using the image post processor to modify next image data to compensate for differences between the expected electrical activity and the actual electrical activity.

In embodiments, the method can further include, wherein the expected electrical activity is determined using a memory including data indicating, an expected output current for a given input current. The method can further include, wherein modifying the next image data includes increasing a pulse width modulation (PWM) on time and/or analog pixel current of a μLED with an actual output current less than the expected output current. The method can further include, wherein modifying the next image data includes decreasing a pulse width modulation (PWM) on time and/or analog pixel current of a μLED with an actual output current greater than the expected output current. The method can further include, wherein modifying the next image data includes increasing a pulse width modulation (PWM) on time and/or analog pixel current of one or more µLEDs directly adjacent to a µLED with actual output current more than a threshold less than the expected output current. The method can further include, wherein the µLEDs are monitored sequentially, with an individual µLED monitored for each received image. The method can further include, wherein modifying the next image data includes increasing an intensity of a most proximate neighboring µLED of a first color for a next image in response to receiving data indicating a µLED of the first color is not producing sufficient output current.

In embodiments, a micro light-emitting diode (µLED) array system can include an image post processor configured to translate received image data to pulse width modulation (PWM) and/or analog pixel current control data. The system can include a µLED die comprising an input frame buffer configured to receive the control data. The µLED die can further include a plurality of individually controllable µLEDS of a µLED array. The µLED die can further include a plurality of µLED drivers configured to drive respective µLEDs based on the control data. The µLED die can further include a return frame buffer that receives data indicating a µLED electrical output characteristic including an output current. The system can further include compare circuitry configured to compare image data from the input and return frame buffers, and transfer comparison data to the image post processor, the image post processor configured to alter individual PWM on time and/or analog pixel current based on the comparison data.

In embodiments, the system can further include a memory including data indicating, an expected output current for a given input current and wherein the compare circuitry is configured to access the memory to make the comparison. The system can further include, wherein the image post processor is configured to increase a PWM on time and/or analog pixel current of a µLED with an output current less than the expected output current indicated in the memory. The system can further include, wherein the image post processor is configured to decrease a PWM on time and/or analog pixel current of a µLED with an output current greater than the expected output current indicated in the memory.

In embodiments, the system can further include, wherein the image post processor is configured to increase a PWM on time and/or analog pixel current of one or more µLEDs directly adjacent to a µLED with output current more than a threshold less than the expected output current indicated in the memory. The system can further include, wherein the image post processor is configured to increase an intensity of a most proximate neighboring µLED of a first color for a next image in response to receiving data indicating a µLED of the first color is not producing sufficient output current.

DETAILED DESCRIPTION

Figure 1:
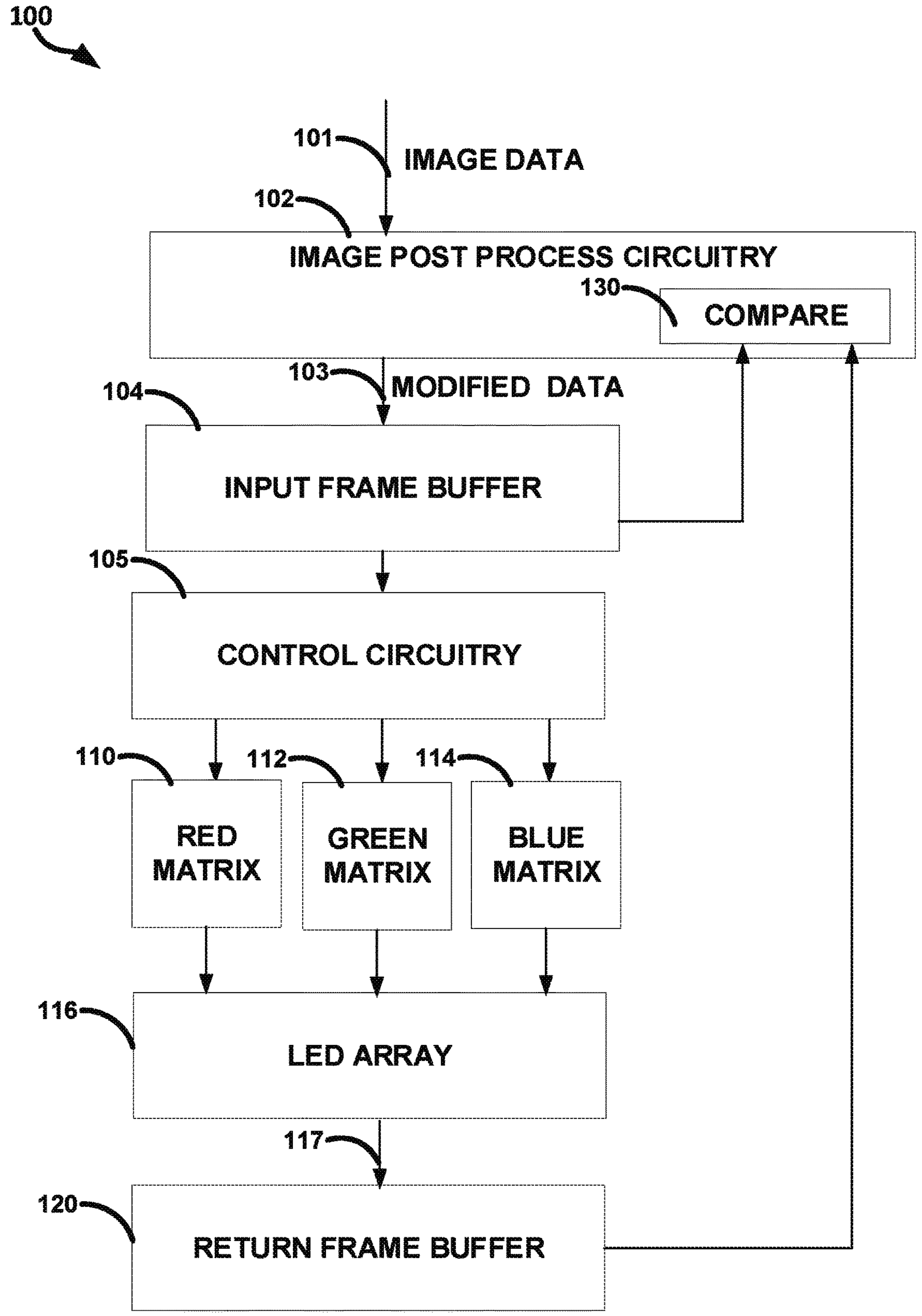
FIG. 1 illustrates an example of a lighting matrix control system with both an input frame buffer and a return frame buffer useful for error correction.

FIG. 1 illustrates an example of a lighting matrix control system 100. A matrix or LEDs means LEDs situated in a regular grid. Such a regular grid of LEDs allows each LED to appear as a pixel of a display. Image data 101 can be received by an image post processing circuitry 102. The image data 101 can be specified in terms of color, temperature, intensity, or the like. The image data 101 can be specified per pixel in some embodiments.

The image post processing circuitry 102 can modify (translate) the image data 101 to create an information stream that will result in a displayable image. The modified data 103 from the image post processing circuitry 102 can include amplitude, duty cycle, pulse width modulation (PWM) on time (for PWM or hybrid drive mode), analog pixel current, or the like. The modified data 103 can be provided to an input frame buffer 104.

The input frame buffer 104 can store the modified data in a first in first out (FIFO) manner, for example. Control circuitry 105 can access the modified image data 103 in the input frame buffer 104 as it is needed.

The control circuitry 105 includes electric or electronic components configured to provide commands to driver circuitry of an LED array 116. The driver circuitry, in response to the commands, individually drives the LEDs of the LED array 116 in accord with the commands. The control circuitry 105 can alter a duty cycle, analog drive mode current, current amplitude, voltage amplitude, PWM on time, or the like of a µLED using the commands.

The electrical or electronic components of circuitry, such as the driver circuitry or control circuitry 105 can include one or more transistors, resistors, diodes, capacitors, switches, oscillators, power supplies, memories, amplifiers, multiplexers, logic gates (e.g., AND, OR, XOR, negate, buffer, or the like), modulators, digital to analog converters (DAC), analog to digital converters (ADC), processing units (e.g., central processing units (CPUs), field programmable gate arrays (FPGAs), graphics processing units (GPUs), or application specific integrated circuits (ASICs), or the like. The electric or electronic components can be configured to perform the operations of the circuitry discussed.

In embodiments, the LED array 116 can be logically divided by color emitted by µLEDs. In some embodiments, each pixel can include three µLEDs of different colors, red matrix 110, green matrix 112, and blue matrix 114 in the example of FIG. 1, but other colors, such as white, yellow, or the like are possible. In such a configuration, each position of the LED array 116 includes three LEDs. In other embodiments, each pixel can include only a single µLED and the color can be one of red, green, blue, yellow, white, or the like. In any case, the control circuitry 105 or the image post process circuitry 102 can include a map of the layout of the LED array including data indicating a position (row, column) of each µLED (or group of µLEDs) and color emitted by the µLED.

The control circuitry 105 can access the modified data 103 in the input frame buffer 104. The control circuitry 105 can command the respective red matrix 110, green matrix 112, and blue matrix 114 μLED drivers of the μLED array 116 to display a full color image (e.g., red, green, blue (RGB)) directly or by projection.

The LED array 116, in response to driving current and voltage from the μLED drivers, can generate light. An intensity of light generated from a μLED can reliably be associated with an electrical current. In general, the greater the output current of the μLED, the greater the intensity of the light generated by the μLED. Thus, the intensity of the light generated can be predicted by the output current. Thus, by monitoring the output current of the μLED, the intensity of the μLED can be reliably predicted. The output current 117 of one or more of the μLEDs from the μLED array 116 can be monitored, such as by the control circuitry 105, and provided to the return frame buffer 120.

The return frame buffer 120 can store electrical characteristics associated with μLEDs (e.g., by position (row, column) in the μLED array 116). The return frame buffer 120 can be accessed by the image post process circuitry 102. The data from the return frame buffer 120 can be compared to the modified data 103. An expected output current of one or more of the μLEDs of the μLED array 116 can be compared to the actual output current 117 from the return frame buffer 120. A difference between an expected output current and actual input current that is greater than a specified threshold can indicate that the μLED is not operating as expected. The threshold can be a specified number of standard deviations from an average current, a specified percentage (e.g., 5%, 10%, 15%, 20%, 25%, a greater or lesser percentage, or some percentage therebetween) of the expected or actual output current, or the like.

The image post process circuitry 102 can then alter image data 101 regarding a next image in response to determining the expected output current is more than a threshold from the actual output current. The alteration to the image data 101 can help compensate for the light intensity difference corresponding to the difference between the actual and expected output currents (e.g., |actual output current−expected input current|). The alteration can include, for example, (i) increasing a PWM on period, analog pixel current, or duty cycle of the μLED that was monitored to increase an average output current value and a perceived light intensity; (ii) increasing a PWM on period, analog pixel current, or duty cycle of one or more μLEDs (of a same color) that neighbor (are directly adjacent or within one hop to the μLED being monitored); (iii) increasing a drive current to the μLED being monitored or one or more neighbor μLEDs of the μLED being monitored, or the like. The increase in PWM on time, duty cycle, analog pixel current, or the like, can increase an intensity of a same color, such as to add the color expected to be produced by the μLED into the image. The increase in PWM on time, duty cycle, analog pixel current, or the like, can increase color around the μLED being monitored such as to hide an aberration produced by the μLED.

The return frame buffer 120 can be used to read out pixel activation and other electrical information related to light intensity. Compare circuitry 130 can be used to detect differences between desired pixel activity as set in the input frame buffer 104 and actual pixel activity as read in the return frame buffer 120. For example, a mismatch in pixel activity can be used by the image post processing circuitry 102 to provide for error correction. As will be appreciated, dedicated hardware components, firmware, FPGA sub-systems, or software systems can optionally be used in whole or in part for implementation of the foregoing described components.

Error correction mechanisms can include but are not limited to excluding failed pixels from use in future frames (e.g., by setting a PWM on time, analog pixel current, or intensity value to zero), substituting redundant pixels (by turning on a redundant pixel that was not used previously and is proximate the μLED being monitored), or using adjacent or surrounding pixels to suitably modify or otherwise heal the image data. In some embodiments, post processing can be done on a per-color basis, with the image post process circuitry 102 acting to correct an RGB pixel triplet, or alternatively, adjusting a single color in a pixel.

Such a system can be useful when fine-grained fault detection and correction control of a large number of full color μLEDs pixels is desired. Failed color pixels can be detected and self-healing, image post-processing, or other algorithmic techniques used to correct or adjust neighboring pixels in substantially real time or near real time to reduce or mitigate negative effects.

Figure 2:
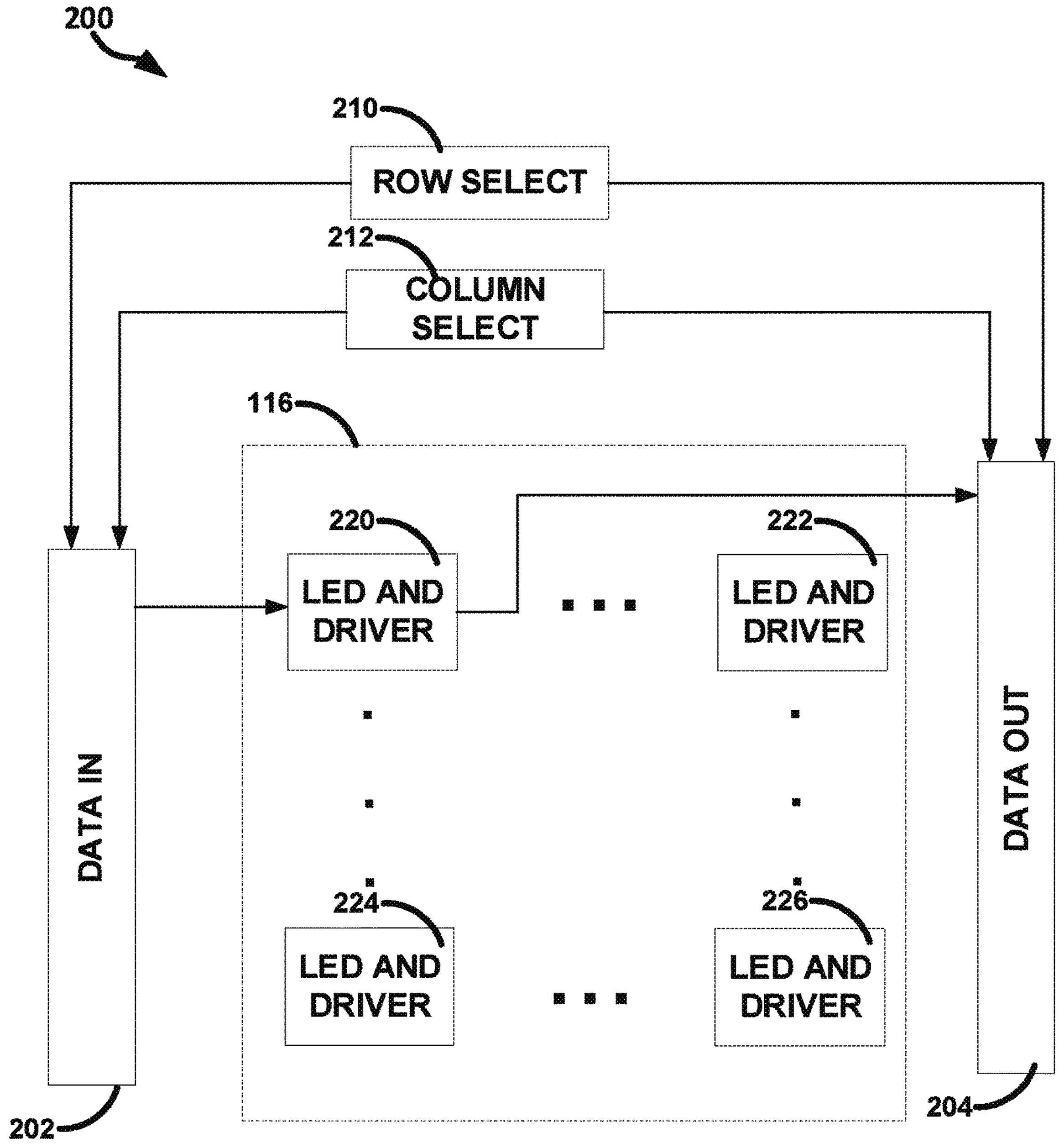
FIG. 2 illustrates examples of row and column select in a lighting matrix.

FIG. 2 illustrates one embodiment of a row and column select in a lighting matrix system 200. A read data in module 202 is used to provide information to a pixel array 116 that allows row select 210 and column select 212 of individual pixels in the array 116. Each representative pixel 220, 222, 224, and 226 includes a microLED and associated pixel driver, typically implemented in a semiconductor die (sometimes called a complementary metal oxide semiconductor (CMOS) backplane). For example, if pixel 220 fails, the associated pixel driver can read an abnormal current provided by the μLED. The pixel driver can signal failure mode by modifying the bitstream. In one embodiment, array output selection can be run in synchronization with input row selection to allow for synchronous return of image data, suitably modified to indicate failure or failure modes. For example, in one embodiment, a parity bit can be flipped to indicate failure. This bitstream can be sent to a read data out module 204, for transfer to a compare module such as described with respect to FIG. 1.

Figure 3:
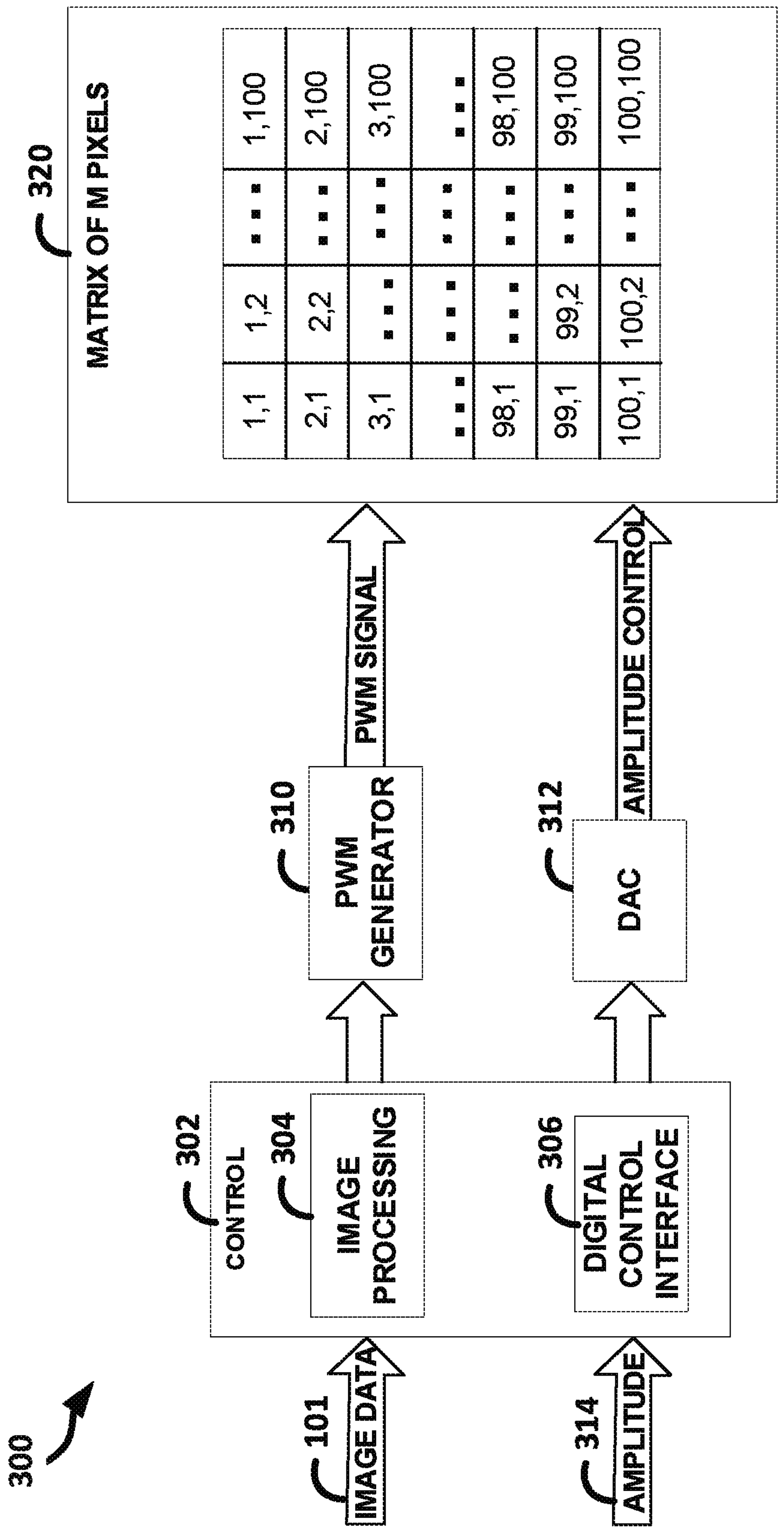
FIG. 3 illustrates one embodiment of a lighting matrix with pulse width modulation (PWM), analog pixel current, or hybrid mode control.

FIG. 3 illustrates one embodiment of a lighting system 300 that includes a matrix 320 of M pixels with PWM control. PWM control is merely an example control scheme and hybrid and analog pixel current drive schemes can be used in place of the PWM control.

In the PWM driving scheme, each LED color is switched on in sequence. Using the PWM driving scheme, each LED color is driven with the same magnitude current. The visible color is controlled by changing the PWM duty cycle of each LED color. That is, one LED color can be driven longer than another LED color to change the mixed color. As human vision is unable to perceive changes in color faster than about 80 Hertz (Hz), the light appears to have one single color.

For example, a first LED color can be driven with a current for a certain amount of time, then the second LED color can be driven with the same current for a certain time, and then the third LED color can be driven with the current for a certain amount of time. The perceived color, as previously discussed, can be controlled by changing the duty cycle of each color. For example, if there are red, green, and blue LEDs and a specific color is desired, the red LED can be driven for a portion of the cycle, the green LED can be driven for a different portion of the cycle, and the blue LED can be driven for yet another portion of the cycle to realize the color. Using PWM, instead of driving the red LED at a lower current, it is driven at the same current for a shorter time. This example demonstrates the downside of PWM with the LEDs poorly utilized leading to inefficiencies.

Using a hybrid driving scheme, the combined benefits of analog and PWM driving schemes are provided. The hybrid driving scheme divides the input current between two LED colors while treating the set of two colors as a virtual LED to overlay PWM time slicing.

Operationally, the hybrid driving scheme is described in U.S. Pat. No. 10,517,156 and utilizes an analog current division circuit to drive two colors of the LED array simultaneously and then overlays PWM time slicing with the third color of the LED array.

The following description summarizes the timing sequence of the operation of the hybrid driving scheme for a 3-channel LED driving. The specific sequence of virtual colors is merely an example. In implementations of the hybrid driving scheme, the color duplets may be arranged or rearranged in a way to reduce or minimize the complexity of the overlaying PWM logic implementation. During a first sub-interval T1, the color duplet of Red-Green may be powered. During a second, immediately subsequent sub-interval T2, the color duplet of Green-Blue may be powered. During the next immediately subsequent sub-interval T3, the color duplet of Red-Blue may be powered. The sum of sub-intervals T1, T2 and T3 combine to substantially cover a switching period T.

In an analog driving scheme, a driving current, rather than a PWM duty cycle, is adjusted to alter a color presented. Each LED is always on, but the driving current (analog pixel current) is changed to alter the color emitted by the LED. Using different mixes of different driving currents can alter the color perceived by a human eye.

The system 300 can include functionality such as described with respect to FIGS. 1 and 2. Pixel intensity can be separately controlled and adjusted by setting appropriate ramp times, amplitude 314, and/or pulse width for each LED pixel using a suitable digital control interface 306 and/or PWM circuitry 310. This is illustrated with respect to FIG. 3, which shows an example of a lighting matrix control system 300 able to provide images for display by arrays of, for example, thousands to millions of μLEDs that actively emit light and are individually controlled. To emit light in a pattern or sequence that results in display of an image, the current levels of the μLEDs at different locations on the pixel matrix 320 are adjusted individually according to a specific image. This pattern or sequence can involve PWM, which turns on and off the pixels at a certain frequency. During PWM operation, an average direct current (DC) current through a pixel is the product of the current amplitude and the PWM duty cycle, which is the ratio between the conduction time and the period or cycle time.

In one embodiment, control circuitry 302 includes image processing circuitry 304 (same or similar to image post process circuitry 102) and digital control interfaces 306, such as inter-integrated circuit ($I^2C$), serial peripheral interface (SPI), controller area network (CAN), universal serial bus (USB), or the like. The image data 101 can be converted to PWM duty cycle values by the image processing circuitry 304. The PWM duty cycles can be modified according to the comparison between the expected output current and the actual output current.

In one embodiment, amplitude related commands can be given separately through a simpler digital interface 306. The control circuity 302 can interpret the image data 101 or modified image data from the image processing circuitry 304, which can then be used by PWM circuitry 310 to generate PWM signals (part of the μLED driver) for pixels, and by digital-to-analog converter (DAC) circuitry 312 to generate the control signals for obtaining the required current source amplitude. These signals can be provided per pixel to control pixels or groups of pixels in the pixel matrix 320. In one embodiment, the return frame buffer 120 can be built into pixel matrix 320 and can be used, by the image processing circuitry 304 or the control circuitry 302 to read out pixel activation and other electrical information related to light intensity. The image post processing circuitry 304 can include compare circuitry to detect differences between desired pixel activity as set in the input frame buffer 104 and actual pixel activity as read in the return frame buffer 120. Similar to those embodiments described with respect to FIGS. 1 and 2, mismatch in pixel activity can be used by the image post processing circuitry 304 to provide for error correction.

Figure 4:
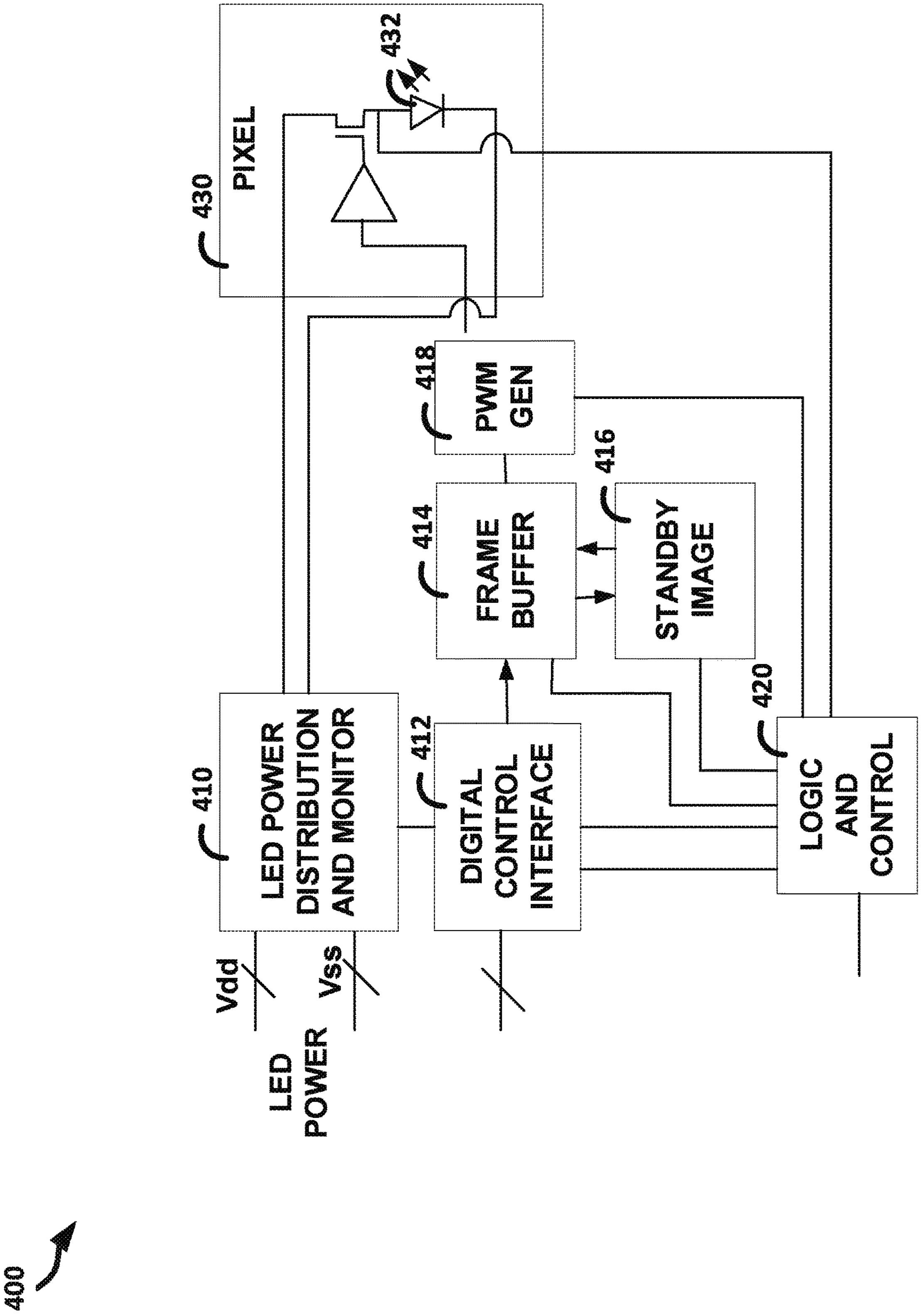
FIG. 4 illustrates an alternative embodiment of a lighting matrix control system that supports a standby image.

FIG. 4 illustrates an alternative embodiment of an error correcting lighting matrix control system 400 suitable for, for example, automotive lighting that supports a standby image. FIG. 4 illustrates one embodiment of various components and modules of an active headlamp system. As illustrated, circuitry includes an LED power distribution and monitor 410 and a logic and control circuitry 420 able to detect LED pixel failure by a mismatch in pixel activity.

In one embodiment, image or other data from a vehicle can arrive via a digital control interface 412. Successive images or video data can be stored in an image frame buffer 414. If no image data is available in the frame buffer 414, one or more standby images held in a standby image buffer 416 can be directed to the image frame buffer 414. Such standby images can include, for example, an intensity and spatial pattern consistent with legally allowed low beam headlamp radiation patterns of a vehicle.

In operation, pixels in the images are used to define response of corresponding LED pixels in the pixel array 430, with intensity and spatial modulation of LED pixels being based on the image(s). Each pixel in the pixel array 430 includes a μLED 432 and the remainder of the pixel array 430 is the μLED driver. To reduce data rate issues, groups of pixels (e.g., 5×5 blocks) can be controlled as single blocks in some embodiments. High speed and high data rate operation can be supported, with pixel values from successive images able to be loaded as successive frames in an image sequence at a specified refresh rate (e.g., often between 30 Hz and 100 Hz, with 60 Hz being typical). In conjunction with PWM circuitry 418, each pixel in the pixel array 430 can be operated to emit light in a pattern and with an intensity at least partially dependent on the image held in the image frame buffer 414.

In one embodiment, intensity can be controlled separately and adjusted by setting appropriate ramp times and pulse width for each LED pixel of the pixel array 430 using logic and control circuitry 420 and the PWM circuitry 418. This control allows staging of LED pixel activation to reduce power fluctuations, and to provide various pixel diagnostic functionality.

Figure 5:
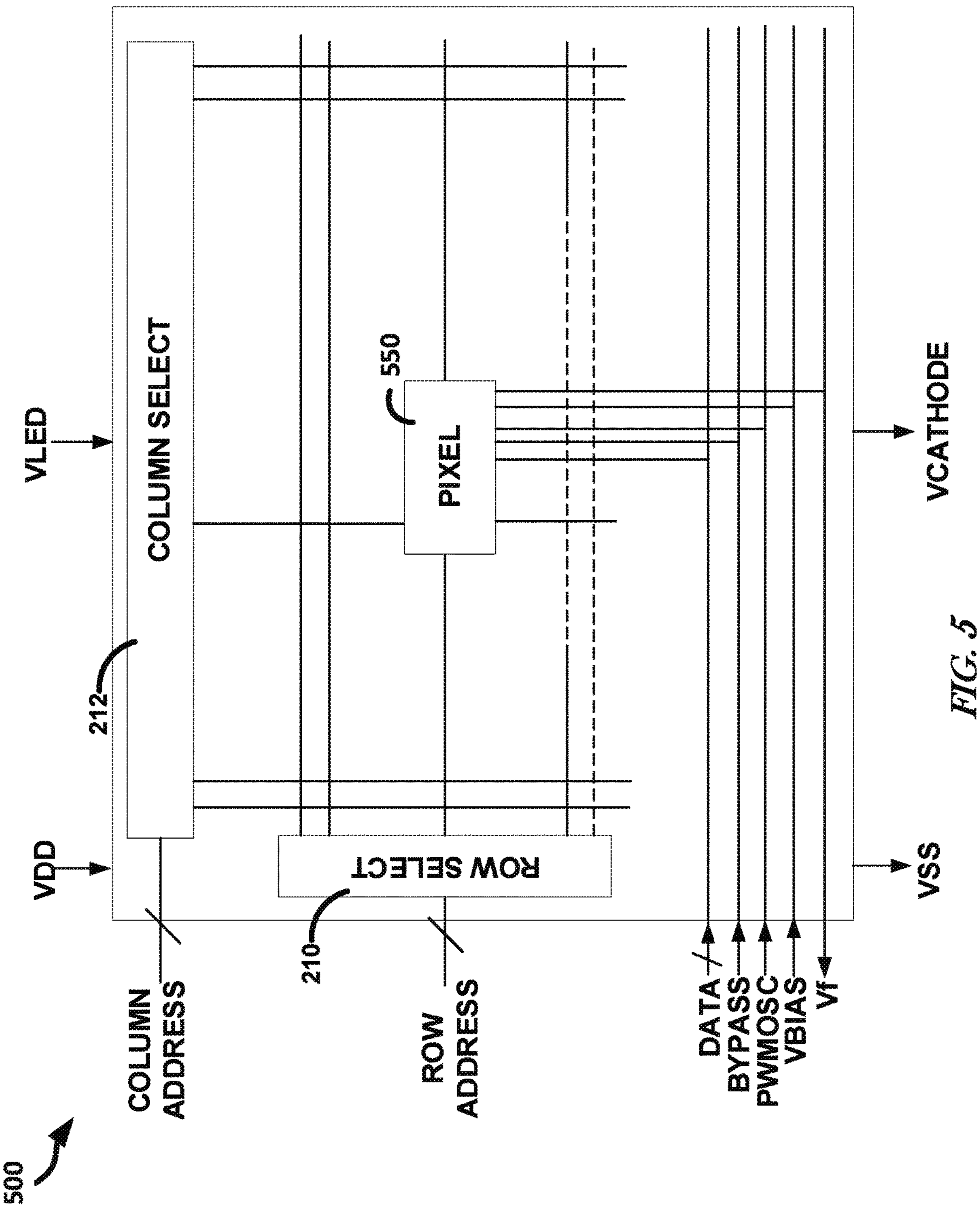
FIG. 5 illustrates one embodiment of a row and column defined lighting matrix.

FIG. 5 illustrates one embodiment of a row and column defined lighting matrix, illustrated in more detail a block diagram 500 of active matrix array able to receive image data from an input frame buffer. Row select 210 and column select 212 can be used to address individual pixels 550, which are supplied with a data line, a bypass line, a PWM oscillator (PWMOSC) line that has a frequency of the PWM, a Vbias line, and a forward voltage (Vf) line. Line means, for example, a trace carrying the indicated signal. Such an array can support fine grained fault detection and correction control of a large number of full color microLED pixels using information from a coupled (e.g., connected) return frame buffer and compare module such as described with respect to FIG. 1.

Figure 6:
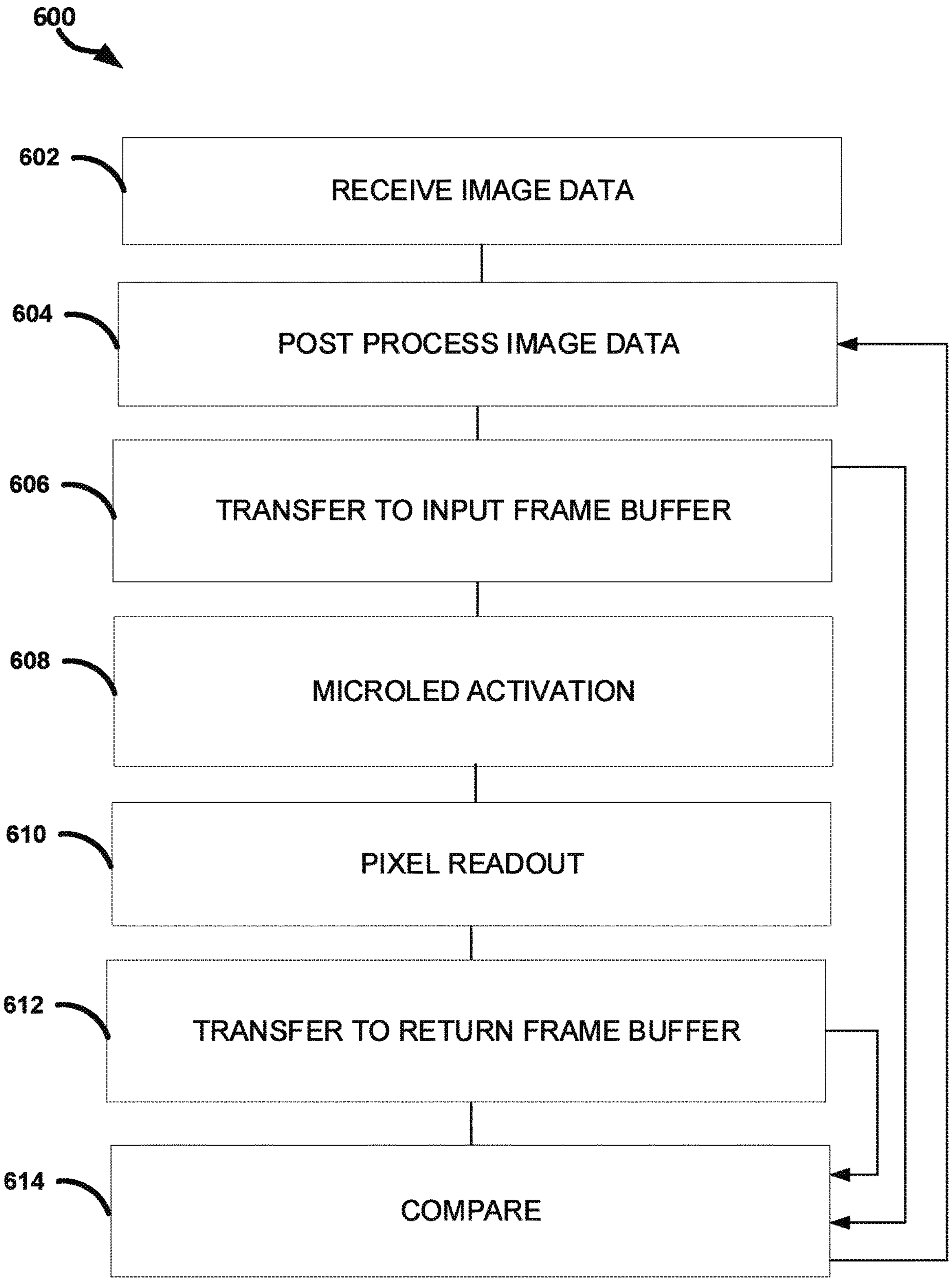
FIG. 6 illustrates an example of a process for error control in lighting matrix control system.

FIG. 6 illustrates, by way of example, a diagram of an embodiment of an exemplary method 600 of pixel fault detection and/or correction. In the embodiment illustrated in FIG. 6, an error correction method for a micro-LED array includes receiving image data 101 (see FIG. 1), at operation 602. The received image data 101 can include, for example, color and/or intensity. At operation 604, the image data 101 received at operation 602 can be post processed (e.g., converted to PWM on times, analog pixel currents, or a combination thereof, such as can account for a discrepancy in expected output current and actual output current). The processed image can be transferred to an input frame buffer at operation 606. The processed image can be used for activating the μLED array at operation 608. After operation 608, a pixel driver can be used for reading out pixel activity, at operation 610. The pixel readout can include an output current or other electrical activity of the μLED and can help identify a pixel error. This pixel electrical activity can be transferred, at operation 612, such as with identified pixel errors, to a return frame buffer. Expected electrical activity determined based on the input frame buffer data can be compared, at operation 614, to the actual electrical activity indicated in the return frame buffer, with differences that are greater than a threshold pointing out errors in pixel activity. This information can be used by the image post processor to modify the processed image to correct pixel errors.

The exemplary method 600 can include, wherein the expected electrical activity is determined using a memory including data indicating, an expected output current for a given input current. The method 600 can include, wherein modifying the next image data includes increasing a pulse width modulation (PWM) on time or analog pixel current, of a μLED with an actual output current less than the expected output current. The method 600 can include, wherein modifying the next image data includes decreasing a pulse width modulation (PWM) on time and/or analog pixel current of a μLED with an actual output current greater than the expected output current.

The exemplary method 600 can include, wherein modifying the next image data includes increasing a pulse width modulation (PWM) on time and/or analog pixel current of one or more μLEDs directly adjacent to a μLED with actual output current more than a threshold less than the expected output current. The method 600 can include, wherein the μLEDs are monitored sequentially, with an individual μLED monitored for each received image. The method 600 can include, wherein modifying the next image data includes increasing an intensity of a most proximate neighboring μLED of a first color for a next image in response to receiving data indicating a μLED of the first color is not producing sufficient output current.

Figure 7:
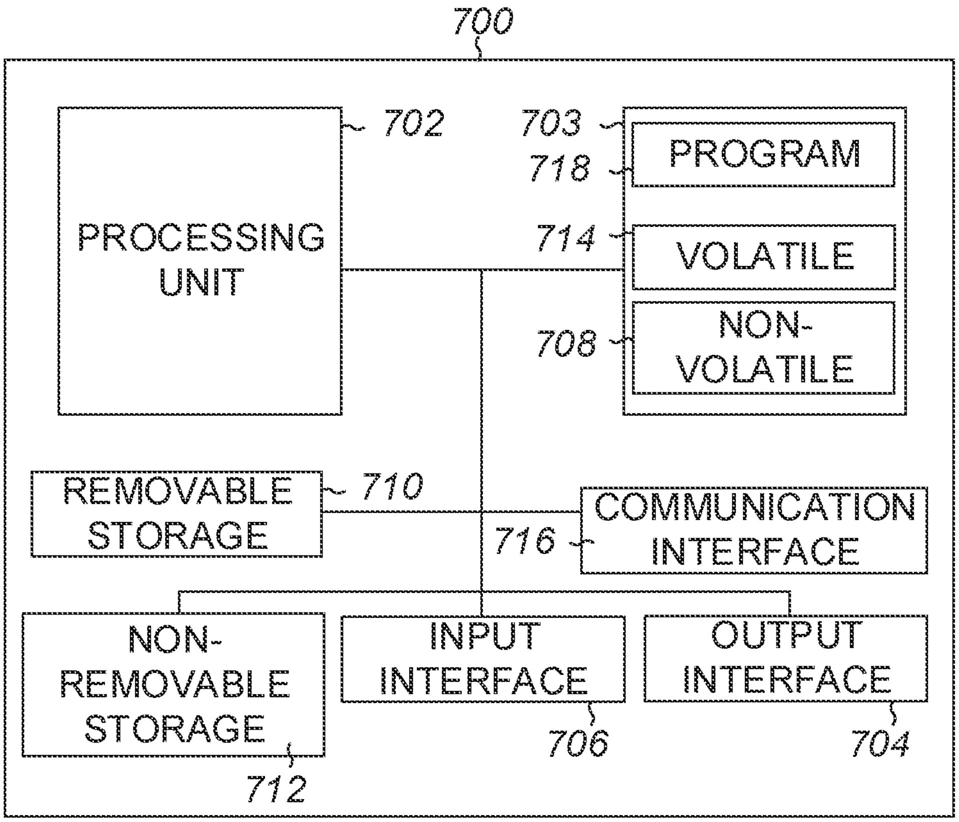
FIG. 7 illustrates, by way of example, a block diagram of an embodiment of a machine (e.g., a computer system) to implement one or more embodiments disclosed herein.

FIG. 7 illustrates, by way of example, a block diagram of an embodiment of a machine 700 (e.g., a computer system) to implement one or more embodiments. The machine 700 can implement a technique for managing underdriven or undriven μLEDs of a μLED die. The control circuitry 105, image post process circuitry 102, control circuitry 302, image processing circuitry 304, digital control interface 306, PWM circuitry 310, DAC 312, LED power distribution and monitor 410, digital control interface 412, PWM circuitry 418, logic and control circuitry 420, as described herein, or a component thereof can include one or more of the components of the machine 700. One or more of the control circuitry 105, image post process circuitry 102, control circuitry 302, image processing circuitry 304, digital control interface 306, PWM circuitry 310, DAC 312, LED power distribution and monitor 410, digital control interface 412, PWM circuitry 418, logic and control circuitry 420, or a component thereof can be implemented, at least in part, using a component of the machine 700. One example machine 700 (in the form of a computer), may include a processing unit 702, memory 703, removable storage 710, and non-removable storage 712. Although the example computing device is illustrated and described as machine 700, the computing device may be in different forms in different embodiments. For example, the computing device may instead be a smartphone, a tablet, smartwatch, or other computing device including the same or similar elements as illustrated and described regarding FIG. 7. Devices such as smartphones, tablets, and smartwatches are generally collectively referred to as mobile devices. Further, although the various data storage elements are illustrated as part of the machine 700, the storage may also or alternatively include cloud-based storage accessible via a network, such as the Internet.

Memory 703 may include volatile memory 714 and non-volatile memory 708. The machine 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 700 may include or have access to a computing environment that includes input 706, output 704, and a communication connection 716. Output 704 may include a display device, such as a touchscreen, that also may serve as an input device. The input 706 may include one or more of a touchscreen, touchpad, mouse, keyboard, camera, one or more device-specific buttons, one or more sensors integrated within or coupled via wired or wireless data connections to the machine 700, and other input devices. The computer may operate in a networked environment using a communication connection to couple or connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi®), Bluetooth®, or other networks.

Computer-readable instructions stored on a computer-readable storage device are executable by the processing unit 702 (sometimes called processing circuitry) of the machine 700. A hard drive, CD-ROM, and RAM are some examples of articles including a non-transitory computer-readable medium such as a storage device. For example, a computer program 718 may be used to cause processing unit 702 to perform one or more methods or algorithms described herein. Non-transitory does not mean incapable of being in motion (incapable of being in transit).

Light emitting matrix pixel arrays may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. The emitted light may be based at least in part on received sensor data and may be used for optical wireless communications. Associated optics may be distinct at a pixel, pixel block, or device level. An example light emitting pixel array may include a device having a commonly controlled central block of high intensity pixels with an associated common optic, whereas edge pixels may have individual optics. Common applications supported by light emitting pixel arrays include video lighting, automotive headlights, architectural and area illumination, street lighting, and informational displays.

Light emitting matrix pixel arrays may be used to selectively and adaptively illuminate buildings or areas for improved visual display or to reduce lighting costs. In addition, light emitting pixel arrays may be used to project media facades for decorative motion or video effects. In conjunction with tracking sensors and/or cameras, selective illumination of areas around pedestrians may be possible. Spectrally distinct pixels may be used to adjust the color temperature of lighting, as well as support wavelength specific horticultural illumination.

In addition to those applications described above, street lighting is another application that may benefit from use of light emitting pixel arrays. A single type of light emitting array may be used to mimic various street light types, allowing, for example, switching between a Type I linear streetlight and a Type IV semicircular streetlight by appropriate activation or deactivation of selected pixels. In addition, street lighting costs may be lowered by adjusting light beam intensity or distribution according to environmental conditions or time of use. For example, light intensity and area of distribution may be reduced when pedestrians are not present. If pixels of the light emitting pixel array are spectrally distinct, the color temperature of the light may be adjusted according to respective daylight, twilight, or night conditions.

Light emitting arrays are also well suited for supporting applications requiring direct or projected displays. For example, warning, emergency, or informational signs may all be displayed or projected using light emitting arrays. This allows, for example, color changing or flashing exit signs to be projected. If a light emitting array is composed of a large number of pixels, textual or numerical information may be presented. Directional arrows or similar indicators may also be provided.

Vehicle headlamps are a light emitting array application that requires large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In addition, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions. Some pixels may be used for optical wireless vehicle to vehicle communication.

An LED light module can include matrix LEDS, alone or in conjunction with primary or secondary optics, including lenses or reflectors. To reduce overall data management requirements, the light module can be limited to on/off functionality or switching between relatively few light intensity levels. Full pixel level control of light intensity is not necessarily supported.

In operation, pixels in the images are used to define response of corresponding LED pixels in the pixel module, with intensity and spatial modulation of LED pixels being based on the image(s). To reduce data rate issues, groups of pixels (e.g. 5×5 blocks) can be controlled as single blocks in some embodiments. High speed and high data rate operation is supported, with pixel values from successive images able to be loaded as successive frames in an image sequence at a rate between 30 Hz and 100 Hz, with 60 Hz being typical in certain applications. In conjunction with a pulse width modulation module, each pixel in the pixel module can be operated to emit light in a pattern and with intensity at least partially dependent on the image held in the image frame buffer.

Many modifications and other alterations of embodiments will come to the mind of one skilled in the art having the benefit of the teachings presented in the foregoing descriptions and the associated drawings. Therefore, it is understood that the embodiments are not to be limited to just the details disclosed, and that modifications and embodiments are intended to be included within the scope of the appended claims. It is also understood that other embodiments may be practiced in the absence of an element/step not specifically disclosed herein.

What is claimed is:

1. A micro light-emitting diode (μLED) array system, the system comprising:

an image post processor configured to translate received image data to at least one parameter selected from parameters including pulse width modulation (PWM) and analog current control data;

an input frame buffer configured to receive and store the control data and store an expected output current;

a plurality of individually controllable μLEDS of a μLED array;

a return frame buffer that is configured to receive and store data indicating a μLED electrical output characteristic including an actual output current; and compare circuitry of the image post processor configured to compare the expected output current and the actual output current determined from the input and return frame buffers, and transfer comparison data to the image post processor, the image post processor configured to alter individual μLED control data based on the comparison data.

2. The μLED array system of claim 1, wherein the image post processor is configured to increase a PWM on at least one parameter selected from parameters including time and analog pixel current of a μLED with an actual output current less than the expected output current.

3. The μLED array system of claim 1, wherein the image post processor is configured to decrease a PWM on at least one parameter selected from parameters including time and analog pixel current of a μLED with an actual output current greater than the expected output current.

4. The μLED array system of claim 1, wherein the image post processor is configured to increase a PWM on at least one parameter selected from parameters including time and an analog pixel current of one or more μLEDs directly adjacent to a μLED with and actual output current more than a threshold less than the expected output current.

5. The μLED array system of claim 1, wherein μLEDs of the μLED array are monitored sequentially, with an individual μLED monitored for each received image.

6. The μLED array system of claim 1, wherein the image post processor is configured to increase an intensity of a most proximate neighboring μLED of a first color for a next image in response to receiving data indicating a μLED of the first color is not producing sufficient output current.

7. An error correction method for a micro light-emitting diode (μLED) die, the method comprising:

post processing received image data to be displayed by a μLED array of the μLED die resulting in processed image data including an expected output current;

transferring the processed image data to an input frame buffer;

activating the μLED array in accord with the processed image data in the input frame buffer;

determining actual electrical activity of one or more μLEDs of the μLED array including an actual output current;

transferring the actual electrical activity to a return frame buffer;

comparing the actual electrical activity from the return frame buffer to expected electrical activity, the expected electrical activity determined based on the processed image data in the input frame buffer; and using an image post processor to modify next image data to compensate for differences between the expected electrical activity and the actual electrical activity.

8. The method of claim 7, wherein modifying the next image data includes increasing a pulse width modulation (PWM) on at least one parameter selected from parameters including time and analog pixel current of a μLED with an actual output current less than the expected output current.

9. The method of claim 7, wherein modifying the next image data includes decreasing a pulse width modulation (PWM) on at least one parameter selected from parameters including time and analog pixel current of a μLED with an actual output current greater than the expected output current.

10. The method of claim 7, wherein modifying the next image data includes increasing a pulse width modulation (PWM) on at least one parameter selected from parameters including time and analog pixel current of one or more μLEDs directly adjacent to a μLED with actual output current more than a threshold less than the expected output current.

11. The method of claim 7, wherein the μLEDs are monitored sequentially, with an individual μLED monitored for each received image.

12. The method of claim 7, wherein modifying the next image data includes increasing an intensity of a most proximate neighboring μLED of a first color for a next image in response to receiving data indicating a μLED of the first color is not producing sufficient output current.

13. A micro light-emitting diode (μLED) array system, the system comprising:

an image post processor configured to translate received image data to at least one parameter selected from parameters including pulse width modulation (PWM) and analog pixel current control data;

a μLED die comprising:

an input frame buffer configured to receive the control data and expected output current;

a plurality of individually controllable μLEDS of a μLED array;

a plurality of μLED drivers configured to drive respective μLEDs based on the control data; and a return frame buffer that is configured to receive data indicating a μLED electrical output characteristic including an actual output current; and compare circuitry configured to compare the expected output current and the actual output current from the input and return frame buffers, respectively, and transfer comparison data to the image post processor, the image post processor configured to alter individual PWM on at least one parameter selected from parameters including time and analog pixel current based on the comparison data.

14. The μLED array system of claim 13, wherein the image post processor is configured to increase a PWM on at least one parameter selected from parameters including time and analog pixel current of a μLED with an actual output current less than the expected output current.

15. The μLED array system of claim 13, wherein the image post processor is configured to decrease a PWM on at least one parameter selected from parameters including time and analog pixel current of a μLED with an actual output current greater than the expected output current.

16. The μLED array system of claim 13, wherein the image post processor is configured to increase a PWM on at least one parameter selected from parameters including time and analog pixel current of one or more μLEDs directly adjacent to a μLED with an actual output current more than a threshold less than the expected output current.

17. The μLED array system of claim 13, wherein the image post processor is configured to increase an intensity of a most proximate neighboring μLED of a first color for a next image in response to receiving data indicating a μLED of the first color is not producing sufficient output current.

* * * * *